(12) United States Patent
Osawa et al.

(10) Patent No.: US 12,227,084 B2
(45) Date of Patent: Feb. 18, 2025

(54) VEHICLE SYSTEM FOR BATTERY MODULE ALLOCATION

(71) Applicant: SUBARU CORPORATION, Tokyo (JP)

(72) Inventors: Mami Osawa, Tokyo (JP); Yuji Ohori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 273 days.

(21) Appl. No.: 17/692,374

(22) Filed: Mar. 11, 2022

(65) Prior Publication Data

US 2022/0314805 A1 Oct. 6, 2022

(30) Foreign Application Priority Data

Mar. 30, 2021 (JP) ................................ 2021-058477

(51) Int. Cl.
*B60L 3/00* (2019.01)
*B60L 58/16* (2019.01)

(52) U.S. Cl.
CPC ............ *B60L 3/0023* (2013.01); *B60L 58/16* (2019.02)

(58) Field of Classification Search
CPC .............................. B60L 3/0023; B60L 58/16
See application file for complete search history.

(56) References Cited

U.S. PATENT DOCUMENTS

| | | | | |
|---|---|---|---|---|
| 2017/0120773 A1* | 5/2017 | Zhang | ............... | H01M 10/0525 |
| 2019/0322193 A1* | 10/2019 | Duan | ................... | B60L 58/20 |
| 2020/0403420 A1 | 12/2020 | Nagase et al. | | |

FOREIGN PATENT DOCUMENTS

| | | | |
|---|---|---|---|
| JP | 2006-20424 A | | 1/2006 |
| JP | 2013-158109 A | | 8/2013 |
| JP | 2014-212630 A | | 11/2014 |
| JP | 2018-26973 A | | 2/2018 |
| JP | 2018026973 A | * | 2/2018 |
| JP | 2019-49412 A | | 3/2019 |

(Continued)

OTHER PUBLICATIONS

Japanese Office Action issued in Japanese Patent Application No. 2021-058477 dated Dec. 3, 2024, with machine translation.

*Primary Examiner* — Aryan E Weisenfeld
*Assistant Examiner* — Shivam Sharma
(74) *Attorney, Agent, or Firm* — TROUTMAN PEPPER HAMILTON SANDERS LLP (57) ABSTRACT

A vehicle includes a traveling motor, a traveling battery that drives at least one wheel, a low-voltage electric component, at least one processor, and a storage medium. The traveling battery includes battery modules each including battery cells and supplies electric power to the traveling motor. The low-voltage electric component operates at a voltage lower than an output voltage of the traveling battery. The storage medium stores a program to be executed by the processor. The program includes at least one command that causes the processor to perform a state-of-health (SOH) calculation process of calculating the SOH of the battery modules, and a selection process of selecting a low-voltage power feeder module from the battery modules based on the SOH calculated in the SOH calculation process. The low-voltage power feeder module corresponds to one of the battery modules to be used to supply electric power to the low-voltage electric component.

8 Claims, 7 Drawing Sheets

(56) References Cited

FOREIGN PATENT DOCUMENTS

| JP | 2020-31471 A | 2/2020 |
| JP | 2021-158709 A | 10/2021 |
| WO | 2019/176395 A1 | 9/2019 |

* cited by examiner

FIG. 8

VEHICLE SYSTEM FOR BATTERY MODULE ALLOCATION

CROSS-REFERENCE TO RELATED APPLICATION

The present application claims priority from Japanese Patent Application No. 2021-058477 filed on Mar. 30, 2021, the entire contents of which are hereby incorporated by reference.

BACKGROUND

The disclosure relates to a vehicle, in particular, to a technology of controlling a traveling battery of the vehicle.

Japanese Unexamined Patent Application Publication (JP-A) No. 2018-026973 discloses a technique to supply electric power to auxiliary devices. In the technique disclosed in JP-A No. 2018-026973, a plurality of power storage element groups are provided. The power storage element groups each include four nodes. The nodes each include a lithium-ion battery with a charging voltage of 3 V. One of the groups is selected periodically and used to supply electric power to the auxiliary devices operable at 12 V.

JP-A No. 2013-158109 discloses another technique to supply electric power to auxiliary devices. In the technique disclosed in JP-A No. 2013-158109, a plurality of battery cell groups are provided. The battery cell groups each include four battery cells. One of the battery cell groups that exhibits the highest charging rate and the frequency in use less than a predetermined value is selected and used to supply electric power to the auxiliary devices.

SUMMARY

An aspect of the technology provides a vehicle including a traveling motor, a traveling battery, a low-voltage electric component, at least one processor, and a storage medium. The traveling motor is configured to drive at least one wheel of the vehicle. The traveling battery includes a plurality of battery modules and is configured to supply electric power to the traveling motor. The battery modules each include a plurality of battery cells. The low-voltage electric component is configured to operate at a voltage lower than an output voltage of the traveling battery. The storage medium is configured to store a program to be executed by the at least one processor. The program includes at least one command. The at least one command is configured to cause the at least one processor to perform a state-of-health calculation process of calculating the states of health of the respective battery modules, and a selection process of selecting a low-voltage power feeder module from the battery modules on the basis of the result of calculation of the states of health in the state-of-health calculation process. The low-voltage power feeder module corresponds to one of the battery modules to be used to supply electric power to the low-voltage electric component.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Some vehicles include a traveling battery that supplies electric power to a traveling motor. The traveling battery includes a plurality of battery modules each including a plurality of battery cells.

The battery modules in the traveling battery deteriorate at different rates in some cases. This can reduce the lifetime of the traveling battery as a whole.

Some vehicles include an auxiliary battery as well as the traveling battery. The auxiliary battery is, for example, a lead-acid battery serving as a power source for auxiliary devices.

However, providing another battery in addition to the traveling battery can increase the number of components to be installed on the vehicle, which is disadvantageous in reducing the weight of the vehicle.

It is desirable to increase the lifetime of a traveling battery and provide a vehicle including no auxiliary battery by substituting one of the battery modules of the traveling battery for an auxiliary battery.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Figure 1:
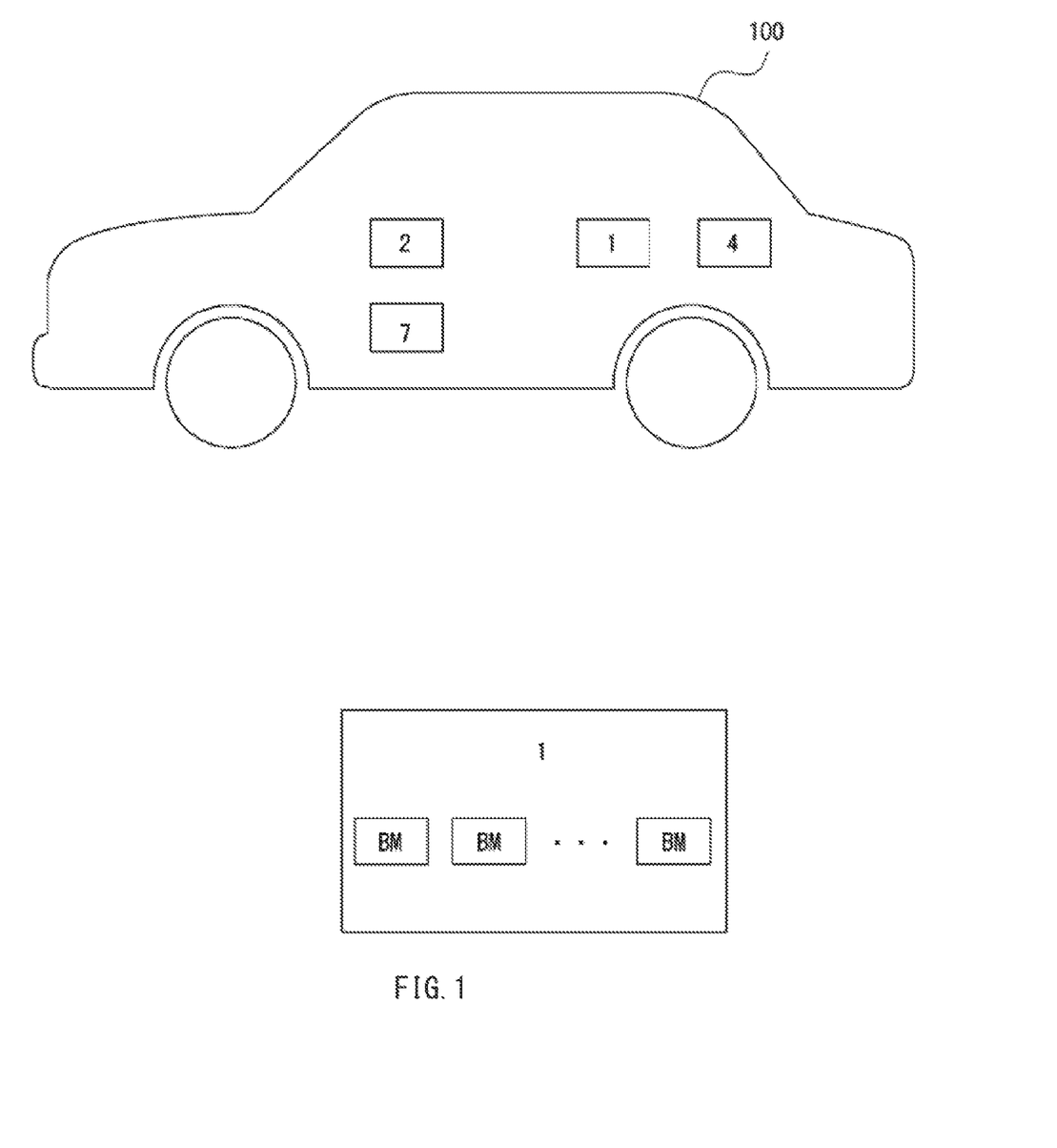
FIG. 1 is a block diagram schematically illustrating an exemplary configuration of a vehicle according to one example embodiment of the technology.

FIG. 1 illustrates an exemplary configuration of a vehicle 100 according to an example embodiment of the technology.

The vehicle 100 includes a traveling battery 1, electric circuitry 2, a traveling motor 4, and a low-voltage electric component 7.

The vehicle 100 may be an electric vehicle (EV), a plug-in hybrid electric vehicle (PHEV), or a mild hybrid electric vehicle (MHEV), for example. In a case where the vehicle 100 is a hybrid electric vehicle, the vehicle 100 may include an engine.

Hereinafter, the EV, the PHEV, the MHEV, and other electric vehicles whose wheels are driven by electric power may be collectively referred to as electric vehicles.

The traveling battery 1 includes a plurality of battery modules BM each including a plurality of battery cells. The traveling battery 1 may be used as a power source for the traveling motor 4. In the present example embodiment, the battery module BM may include four battery cells, for example.

Although not illustrated, the battery module BM may include a voltage sensor and a current sensor that detect the state of charge (SOC) and the resistance of the battery module BM.

The electric circuitry 2 may include an electric power supply path of the traveling battery 1 and a battery control unit (BCU), for example. The configuration of the electric circuitry 2 is described in detail below.

The traveling motor 4 may be a motor generator configured to operate with a voltage of about 200 V, for example, to drive the wheels. Alternatively, the traveling motor 4 may be a motor generator configured to operate with a voltage of about 48 V, for example, to assist the engine torque, for example.

The low-voltage electric component 7 may collectively refer to low-voltage electric components operable with a rated voltage lower than a required voltage of the traveling motor 4. The low-voltage electric component 7 may include, for example, light devices, auxiliary devices such as a starter, and various electronic control units (ECU) of the vehicle 100. The rated voltage of the low-voltage electric component 7 may be about 12 V, for example.

An exemplary configuration of the electric circuitry 2 of the vehicle 100 will now be described with reference to FIG. 2.

The electric circuitry 2 of the vehicle 100 may include a BCU 3, a relay 5, a selection unit 6, an inverter 8, and a DC/DC converter 9.

Figure 2:
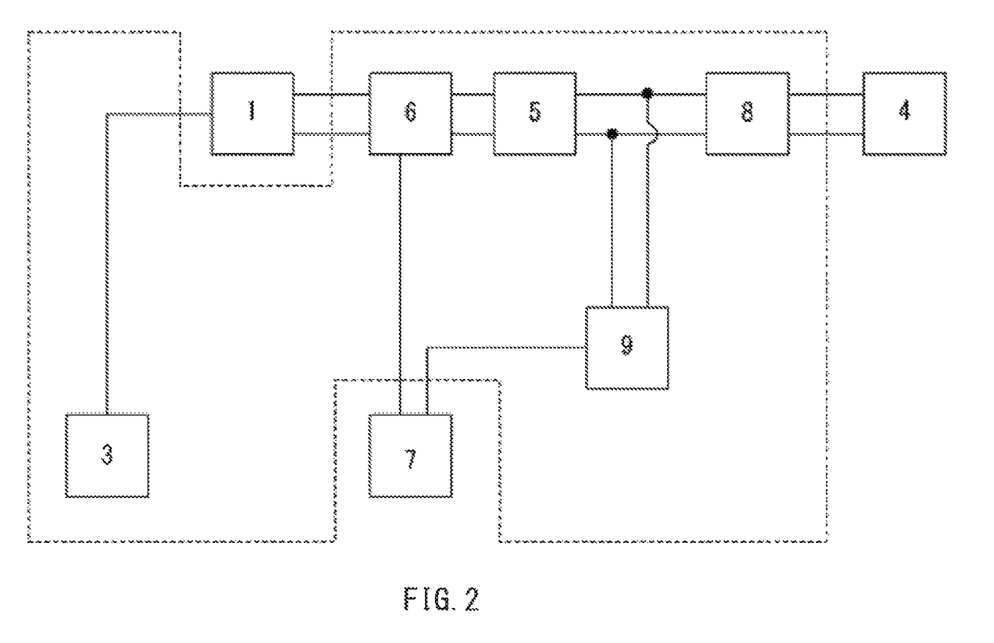
FIG. 2 is a block diagram illustrating an exemplary power supply system of the vehicle according to the example embodiment of the technology.

Note that FIG. 2 illustrates the traveling battery 1, the traveling motor 4, and the low-voltage electric component 7 that are illustrated in FIG. 1 as well as the electric circuitry 2.

The BCU 3 may include a microcomputer including, for example, a central processing unit (CPU), a read only memory (ROM), and a random access memory (RAM). In one embodiment, the CPU may serve as "at least one processor". In one embodiment, the ROM may serve as a "storage medium". The BCU 3 may cause the CPU to execute processing in accordance with programs stored in the ROM to achieve various control. For example, the BCU 3 may achieve interrupting control of the relay 5 while an ignition (IG) is turned on, or switching control of the selection unit 6 described below.

The relay 5 may include an electromagnetic relay. The relay 5 may make a switch between an interrupted state and a non-interrupted state. In the interrupted state, the electric power supply path from the traveling battery 1 to the traveling motor 4 may be interrupted under the control of the BCU 3. In the non-interrupted state, the electric power supply path from the traveling battery 1 to the traveling motor 4 may not be interrupted.

This configuration interrupts the high-voltage circuit when the IG is turned off (i.e., in an IG-OFF state described below). Accordingly, it is possible to enhance the safety of the vehicle 100.

The selection unit 6 may select one of the battery modules BM of the traveling battery 1 and electrically couple or decouple the selected battery module BM to/from the low-voltage electric component 7 in accordance with a command from a selection processing unit 12 described below. Additionally, the selection unit 6 may couple or decouple the battery modules BM to/from each other.

A method of selecting the battery module BM to be electrically coupled to the low-voltage electric component 7 is described below. Hereinafter, the battery module BM selected to be electrically coupled to the low-voltage electric component 7 may be referred to as a low-voltage power feeder module LB.

The inverter 8 may generate a drive voltage for the traveling motor 4 on the basis of a DC voltage supplied from the traveling battery 1, and supply the drive voltage to the traveling motor 4.

The DC/DC converter 9 may be a stepdown DC/DC converter that steps down an output voltage of the traveling battery 1.

In the present example embodiment, the low-voltage electric component 7 may be fed with electric power also by stepping down the output voltage of the traveling battery 1 by the DC/DC converter 9.

Figure 3:
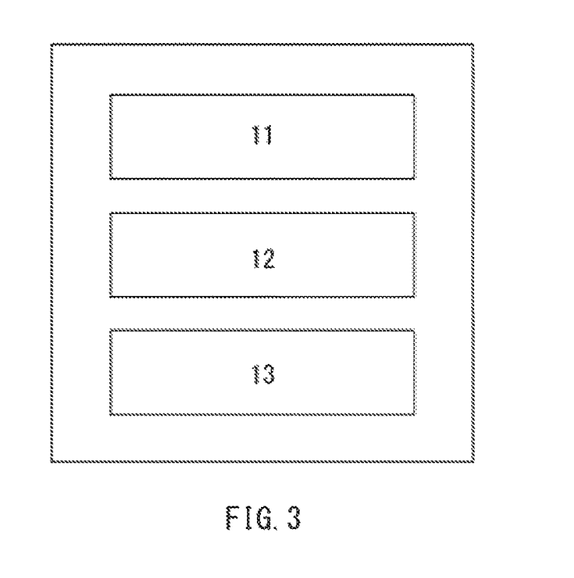
FIG. 3 is a block diagram illustrating an exemplary operational configuration of a battery control unit (BCU) of the vehicle according to the example embodiment of the technology.

An exemplary operational configuration of the BCU 3 will now be described with reference to FIG. 3.

The BCU 3 may include an SOH calculation unit 11, the selection processing unit 12, and an IG determination unit 13.

The SOH calculation unit 11 may calculate the states of health (SOH) of the respective battery modules BM in the traveling battery 1.

The SOH may be calculated by two methods: a method based on the SOC of the battery modules BM on a full charge, and a method based on the resistance of the battery modules BM.

In the method based on the SOC of the battery modules BM on a full charge, the SOH may be determined by calculating the rate of decrease in SOC with respect to a reference SOC, i.e., the SOC of the battery modules BM on a full charge. For example, the reference SOC may be defined as the initial SOC of the battery modules BM on a full charge at the time of the shipment from the factory.

The electric vehicle (EV) may be generally driven only by the driving power of the traveling motor 4. The traveling battery 1 applied to the EV may thus have a relatively large capacity to increase the cruising distance.

Accordingly, the method of calculating the SOH on the basis of the SOC of the battery modules BM on a full charge is suitable for cruising distance-centered electric vehicles.

In the method based on the resistance of the battery modules BM, the SOH may be determined by calculating the rate of increase in resistance of the traveling battery 1 with respect to a reference resistance.

For example, the reference resistance may be defined as the initial resistance of the battery modules BM at the time of shipment from the factory.

The electric vehicle such as the MHEV may generally operate the traveling motor to assist the output of the engine. The traveling battery 1 applied to the MHEV may thus have a relatively small capacity.

Accordingly, the method of calculating the SOH on the basis of the resistance of the battery modules BM is suitable for output-centered electric vehicles.

The selection processing unit 12 may perform a selection process of selecting the battery module BM to be used to feed electric power to the low-voltage electric component 7 on the basis of the SOH of the battery modules BM calculated by the SOH calculation unit 11.

In the present example embodiment, the battery module BM exhibiting the lowest SOH (hereinafter referred to as a lowest SOH module BB) may be selected as the low-voltage power feeder module LB to be used to feed electric power to the low-voltage electric component 7.

After selecting the low-voltage power feeder module LB, the selection processing unit 12 may control the selection unit 6 to cause the low-voltage power feeder module LB to feed electric power to the low-voltage electric component 7.

The IG determination unit 13 may determine the state of the IG of the vehicle 100.

In the present example embodiment, the IG determination unit 13 may be configured to determine three states of the IG: an IG-OFF state, an IG-ON state, and a READY-ON state.

The state of the IG of the vehicle 100 may change depending on a user's operation on a start button or a key.

The IG-OFF state may refer to the state in which the vehicle 100 is not started. In the IG-OFF state, the BCU 3 may bring the relay 5 into the interrupted state to electrically separate the traveling battery 1 from the traveling motor 4.

The IG-ON state may refer to the state established after the user presses the start button down once or turns the key to an adaptive cruise control (ACC) position in the IG-OFF state. In the IG-ON state, the BCU 3 may cause one of the battery modules BM of the traveling battery 1 to feed electric power to the low-voltage electric component 7, and cause the relay 5 to maintain the interrupted state.

The READY-ON state may refer to the state established after the user presses the start button down once or turns the key to an IG position in the IG-ON state. In the READY-ON state, the BCU 3 may bring the relay 5 into the non-interrupted state to cause the traveling battery 1 to feed electric power to the traveling motor 4.

In actual driving of the vehicle, the user may perform a jump start operation by pressing the start button down once while depressing the brake pedal. The jump start operation may shift the state of the IG from the IG-OFF state to the READY-ON state. That is, the jump start operation may shift the state of the IG from IG-OFF state to the READY-ON state without making the user notice the IG-ON state. However, the state of the IG may be actually shifted from the IG-OFF state to the READY-ON state through the IG-ON state lasting for several hundred milliseconds.

An exemplary configuration and an exemplary operation of the selection unit 6 will now be described with reference to FIGS. 4 to 6.

In this example, the traveling battery 1 may include a first battery module BM1, a second battery module BM2, a third battery module BM3, and a fourth battery module BM4.

The selection unit 6 may include a positive electrode terminal switch Sp1, a negative electrode terminal switch Sm1, a positive electrode terminal switch Sp2, a negative electrode terminal switch Sm2, a positive electrode terminal switch Sp3, a negative electrode terminal switch Sm3, a positive electrode terminal switch Sp4, a negative electrode terminal switch Sm4, a bypass switch Sb12, a bypass switch Sb23, a bypass switch Sb24, and a bypass switch Sb34.

These switches excluding the bypass switch Sb24 may each be a three-terminal switch that includes a terminal t1, a terminal t2, and a terminal t3. The three-terminal switch may be configured to couple the terminal t1 to the terminal t2 or the terminal t3. The bypass switch Sb24 may be an ON/OFF switch that includes only the terminal t1 and the terminal t2.

The terminal t1 of the positive electrode terminal switch Sp1 may be coupled to a positive electrode terminal of the battery module BM1. The terminal t2 of the positive electrode terminal switch Sp1 may be coupled to a positive electrode side of the low-voltage electric component 7. The terminal t3 of the positive electrode terminal switch Sp1 may be coupled to a positive electrode side of the traveling motor 4 and a positive electrode side of the DC/DC converter 9 via the relay 5. The terminal t3 of the positive electrode terminal switch Sp1 may be also coupled to the terminal t3 of the bypass switch Sb12.

The terminal t1 of the negative electrode terminal switch Sm1 may be coupled to a negative electrode terminal of the first battery module BM1. The terminal t2 of the negative electrode terminal switch Sm1 may be coupled to a negative electrode side of the low-voltage electric component 7. The terminal t3 of the negative electrode terminal switch Sm1 may be coupled to the terminal t2 of the bypass switch Sb12 and the terminal t3 of the bypass switch Sb23.

The terminal t1 of the positive electrode terminal switch Sp2 may be coupled to a positive electrode terminal of the second battery module BM2. The terminal t2 of the positive electrode terminal switch Sp2 may be coupled to the positive electrode side of the low-voltage electric component 7. The terminal t3 of the positive electrode terminal switch Sp2 may be coupled to the terminal t1 of the bypass switch Sb12.

The terminal t1 of the negative electrode terminal switch Sm2 may be coupled to a negative electrode terminal of the second battery module BM2. The terminal t2 of the negative electrode terminal switch Sm2 may be coupled to the negative electrode side of the low-voltage electric component 7. The terminal t3 of the negative electrode terminal switch Sm2 may be coupled to the terminal t2 of the bypass switch Sb23 and the terminal t1 of the bypass switch Sb24.

The terminal t1 of the positive electrode terminal switch Sp3 may be coupled to a positive electrode terminal of the third battery module BM3. The terminal t2 of the positive electrode terminal switch Sp3 may be coupled to the positive electrode side of the low-voltage electric component 7. The terminal t3 of the positive electrode terminal switch Sp3 may be coupled to the terminal t1 of the bypass switch Sb23.

The terminal t1 of the negative electrode terminal switch Sm3 may be coupled to a negative electrode terminal of the third battery module BM3. The terminal t2 of the negative electrode terminal switch Sm3 may be coupled to the negative electrode side of the low-voltage electric component 7. The terminal t3 of the negative electrode terminal switch Sm3 may be coupled to the terminal t1 of the bypass switch Sb34.

The terminal t1 of the positive electrode terminal switch Sp4 may be coupled to a positive electrode terminal of the fourth battery module BM4. The terminal t2 of the positive electrode terminal switch Sp4 may be coupled to the positive electrode side of the low-voltage electric component 7. The terminal t3 of the positive electrode terminal switch Sp4 may be coupled to the terminal t2 of the bypass switch Sb34 and the terminal t2 of the bypass switch Sb24.

The terminal t1 of the negative electrode terminal switch Sm4 may be coupled to a negative electrode terminal of the fourth battery module BM4. The terminal t2 of the negative electrode terminal switch Sm4 may be coupled to the negative electrode side of the low-voltage electric component 7. The terminal t3 of the negative electrode terminal switch Sm4 may be coupled to a negative electrode side of the traveling motor 4 and a negative electrode side of the DC/DC converter 9 via the relay 5. The terminal t3 of the negative electrode terminal switch Sm4 may be also coupled to the terminal t3 of the bypass switch Sb34.

Figure 4:
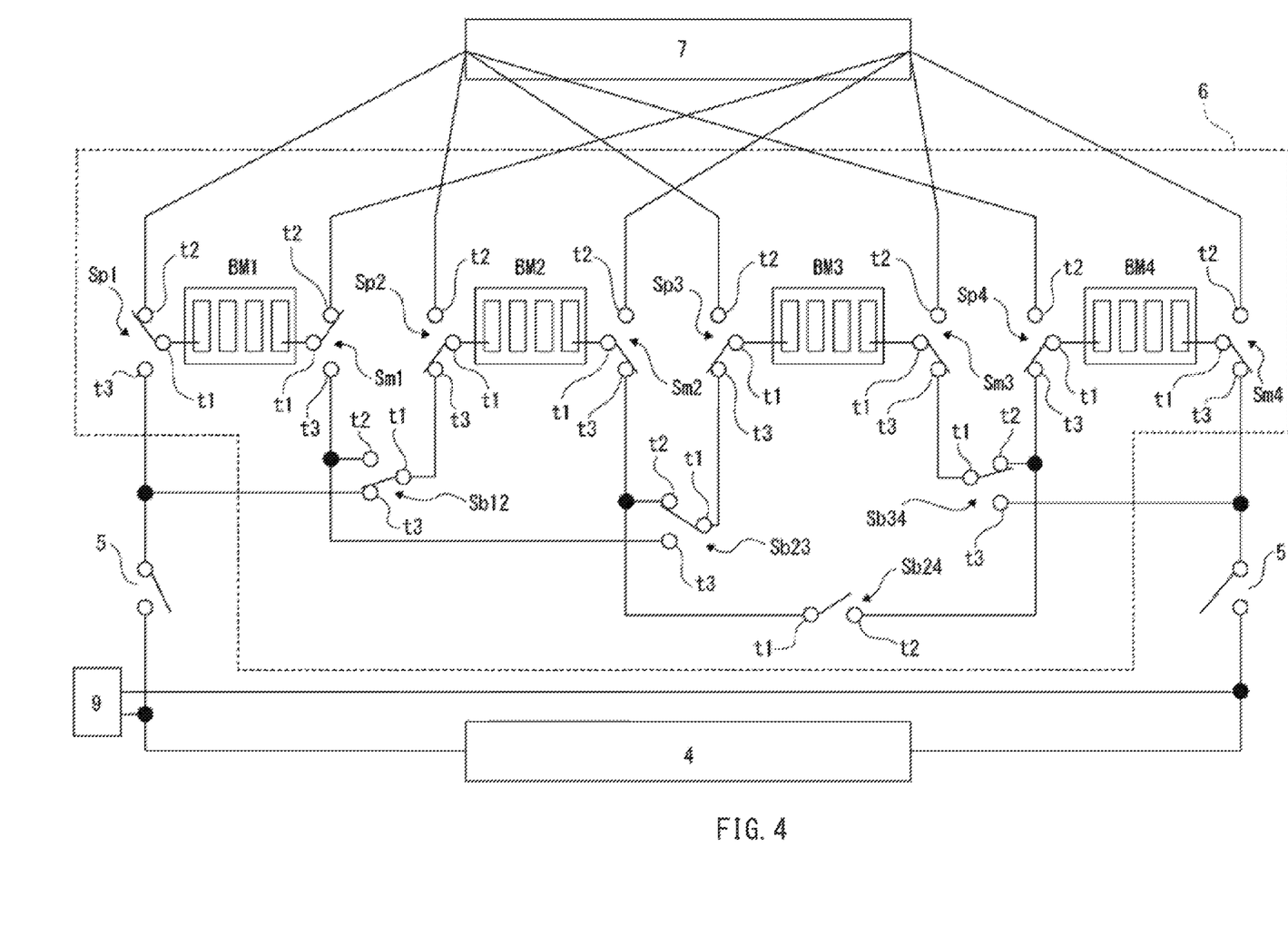
FIG. 4 is a conceptual diagram illustrating an exemplary state of a selection unit at the time when a first battery module is selected as a low-voltage power feeder module by a selection processing unit in an IG-OFF state.

FIG. 4 illustrates an exemplary state of the selection unit 6 at the time when the first battery module BM1 is selected as the low-voltage power feeder module LB in the IG-OFF state.

In the state illustrated in FIG. 4, the terminal t1 and the terminal t2 of the positive electrode terminal switch Sp1 may be coupled to each other, and the terminal t1 and the terminal t2 of the negative electrode terminal switch Sm1 may be coupled to each other. Thus, the positive electrode terminal of the first battery module BM1 selected by the selection processing unit 12 may be electrically coupled to the positive electrode side of the low-voltage electric component 7, and the negative electrode terminal of the first battery module BM1 may be electrically coupled to the negative electrode side of the low-voltage electric component 7.

At this time, the terminal t1 and the terminal t3 of the bypass switch Sb12 may be coupled to each other, the terminal t1 and the terminal t2 of the bypass switch Sb23 may be coupled to each other, and the terminal t1 and the terminal t3 of the bypass switch Sb34 may be coupled to each other. The bypass switch Sb24 may be brought into the interrupted state. The first battery module BM1 may be thereby electrically separated from the second battery module BM2, and the second battery module BM2, the third battery module BM3, and the fourth battery module BM4 may be electrically coupled to each other.

Additionally, the battery modules BM may be electrically separated from the traveling motor 4 as the relay 5 is in the interrupted state.

When the state of the IG is shifted to the IG-ON state in such a condition, only the first battery module BM1 may feed electric power to the low-voltage electric components operable in the IG-ON state in the low-voltage electric component 7.

Figure 5:
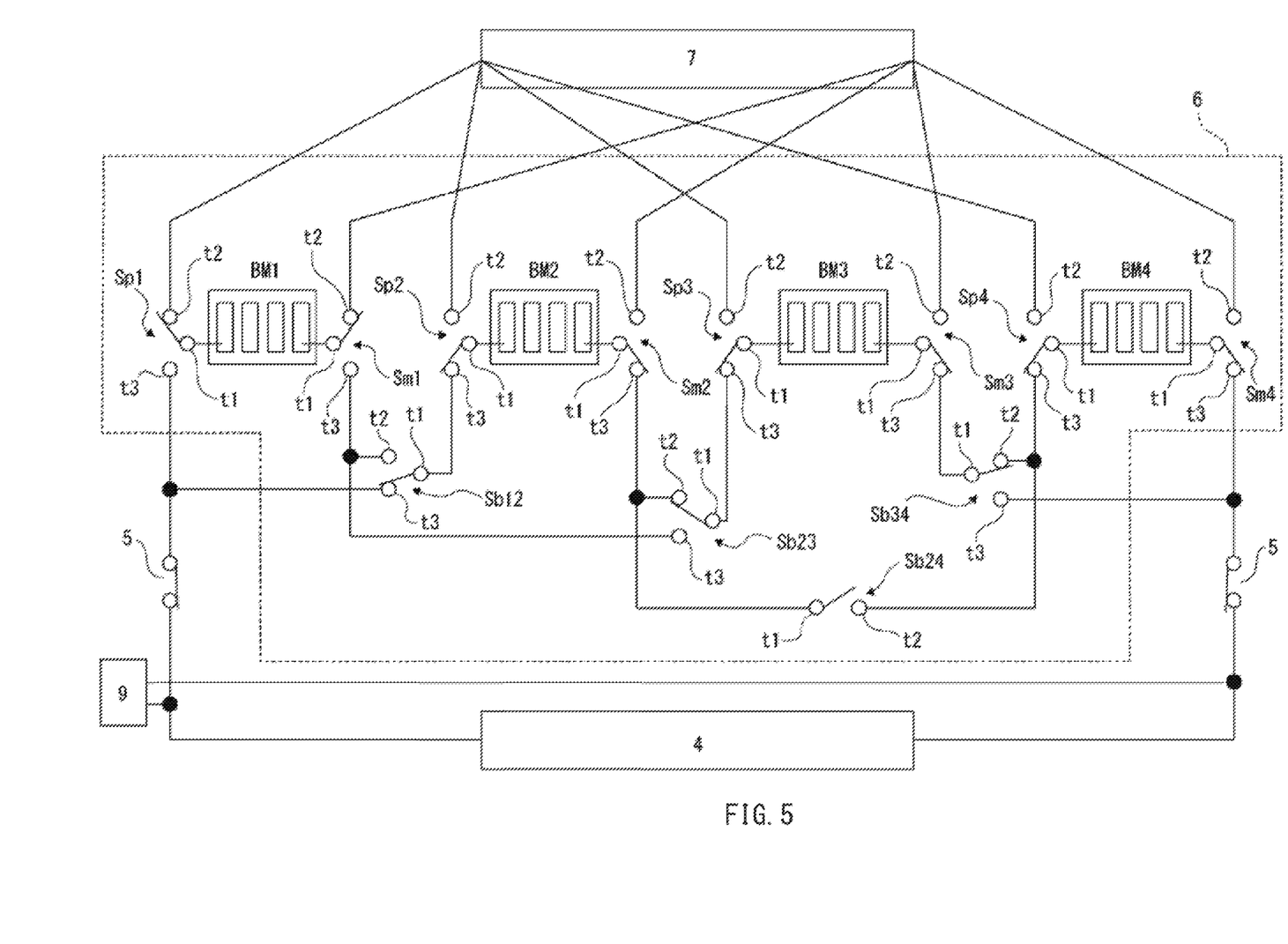
FIG. 5 is a conceptual diagram illustrating an exemplary state of the selection unit at the time when the first battery module is selected as the low-voltage power feeder module by the selection processing unit in a READY-ON state.

FIG. 5 illustrates an exemplary state of the selection unit 6 at the time when the state illustrated in FIG. 4 is shifted to the READY-ON state.

In the READY-ON state, the relay 5 may be brought into the non-interrupted state. Thus, the traveling battery 1 may be electrically coupled to the traveling motor 4.

As described above, in a condition where the first battery module BM1 is selected as the low-voltage power feeder module LB, the second battery module BM2, the third battery module BM3, and the fourth battery module BM4 may be electrically coupled to each other to serve as a power source for the traveling motor 4.

As the relay 5 is in the non-interrupted state in the condition illustrated in FIG. 5, the positive electrode terminal of the second battery module BM2 may be electrically coupled to the positive electrode side of the traveling motor 4, and the negative electrode terminal of the fourth battery module BM4 may be electrically coupled to the negative electrode side of the traveling motor 4.

Accordingly, the traveling motor 4 may be fed with electric power from the second battery module BM2, the third battery module BM3, and the fourth battery module BM4.

The first battery module BM1 selected by the selection unit 6 and electrically coupled to the low-voltage electric component 7 may be the lowest SOH module BB whose SOH is determined to be low by the selection processing unit 12.

Accordingly, the first battery module BM1 electrically coupled to the low-voltage electric component 7 does not experience a large load while the vehicle 100 is traveling. This configuration retards the deterioration of the first battery module BM1.

Figure 6:
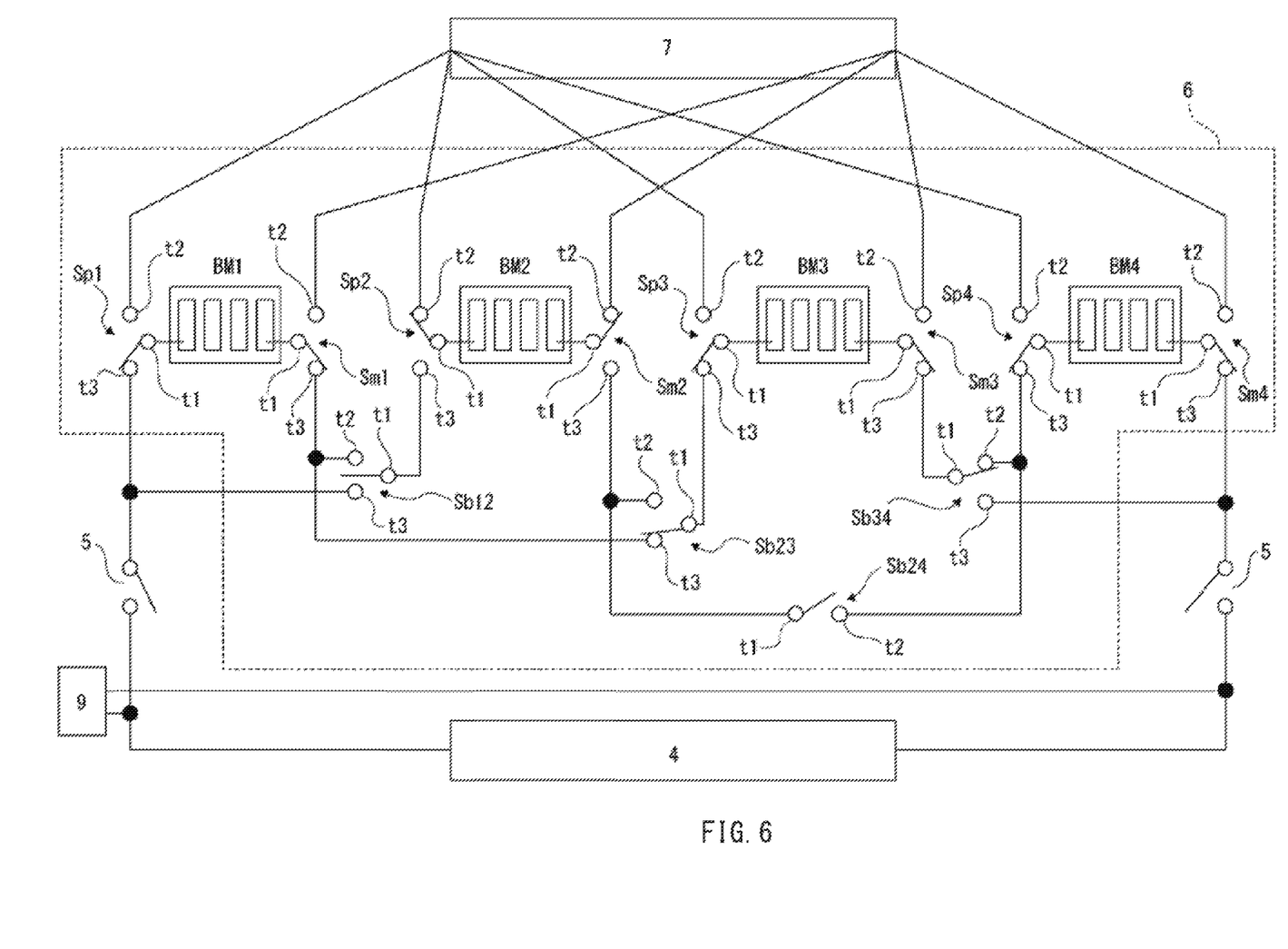
FIG. 6 is a conceptual diagram illustrating an exemplary state of the selection unit at the time when a second battery module is selected as the low-voltage power feeder module by the selection processing unit in an IG-OFF state.

FIG. 6 illustrates an exemplary state of the selection unit 6 at the time when the state illustrated in FIG. 5 is shifted to the IG-OFF state and when the low-voltage power feeder module LB selected by the selection processing unit 12 is switched from the first battery module BM1 to the second battery module BM2.

In such a condition, the terminal t1 and the terminal t3 of the positive electrode terminal switch Sp1 may be coupled to each other, and the terminal t1 and the terminal t3 of the negative electrode terminal switch Sm1 may be coupled to each other. Thus, the first battery module BM1 may be electrically separated from the low-voltage electric component 7. Additionally, the terminal t1 and the terminal t2 of the positive electrode terminal switch Sp2 may be coupled to each other, and the terminal t1 and the terminal t2 of the negative electrode terminal switch Sm2 may be coupled to each other. Thus, the second battery module BM2 may be electrically coupled to the low-voltage electric component 7. Additionally, the terminal t1 and the terminal t3 of the bypass switch Sb23 may be coupled to each other. Thus, the second battery module BM2 and the third battery module BM3 may be electrically separated from each other, and the first battery module BM1 and the third battery module BM3 may be electrically coupled. Note that, in FIG. 6, the terminal t1 of the bypass switch Sb12, which needs not to be electrically coupled, is coupled to neither the terminal t2 nor the terminal t3. However, the terminal t1 of the bypass switch Sb12 may be alternatively coupled to the terminal t2 or the terminal t3 of the bypass switch Sb12.

When the state of the IG is shifted to the IG-ON state in such a condition, only the second battery module BM2 may feed electric power to the low-voltage electric components operable in the IG-ON state in the low-voltage electric component 7.

When the state of the IG is further shifted from the IG-ON state to the READY-ON state, the relay 5 may be brought into the non-interrupted state. Thus, the traveling motor 4 may be fed with electric power from the first battery module BM1, the third battery module BM3, and the fourth battery module BM4.

Although not illustrated, even in a case where the third battery module BM3 or the fourth battery module BM4 is selected as the low-voltage power feeder module LB by the selection processing unit 12, the low-voltage power feeder module LB may be switched by controlling the coupling state of terminals of the corresponding switches in a similar manner to that described above.

In the present example embodiment, the number of the battery modules BM is four; however, the number of the battery modules BM should not be limited to four. The present example embodiment may be applied to the traveling battery 1 including two or more battery modules BM.

In the READY-ON state, the battery modules BM differ in voltage from each other as the low-voltage power feeder module LB and the other battery modules BM are in use. Thus, all the interrupting control described above may be performed only in the IG-OFF state.

An exemplary switching timing of the low-voltage power feeder module LB will now be described with reference to FIG. 7. In the example described below, the traveling battery 1 may include three battery modules: a battery module A, a battery module B, and a battery module C.

The initial SOH of each of the battery modules A, B, and C may be 100%.

In this case, the selection processing unit 12 may select any of the battery modules A, B, and C as the low-voltage power feeder module LB.

Thereafter, the rates of decrease in SOH of the battery modules BM may differ from each other. In the present example embodiment, the low-voltage power feeder module LB may be switched when the difference in SOH between the battery module BM selected as the low-voltage power feeder module LB and the lowest SOH module BB reaches a predetermined value.

Figure 7:
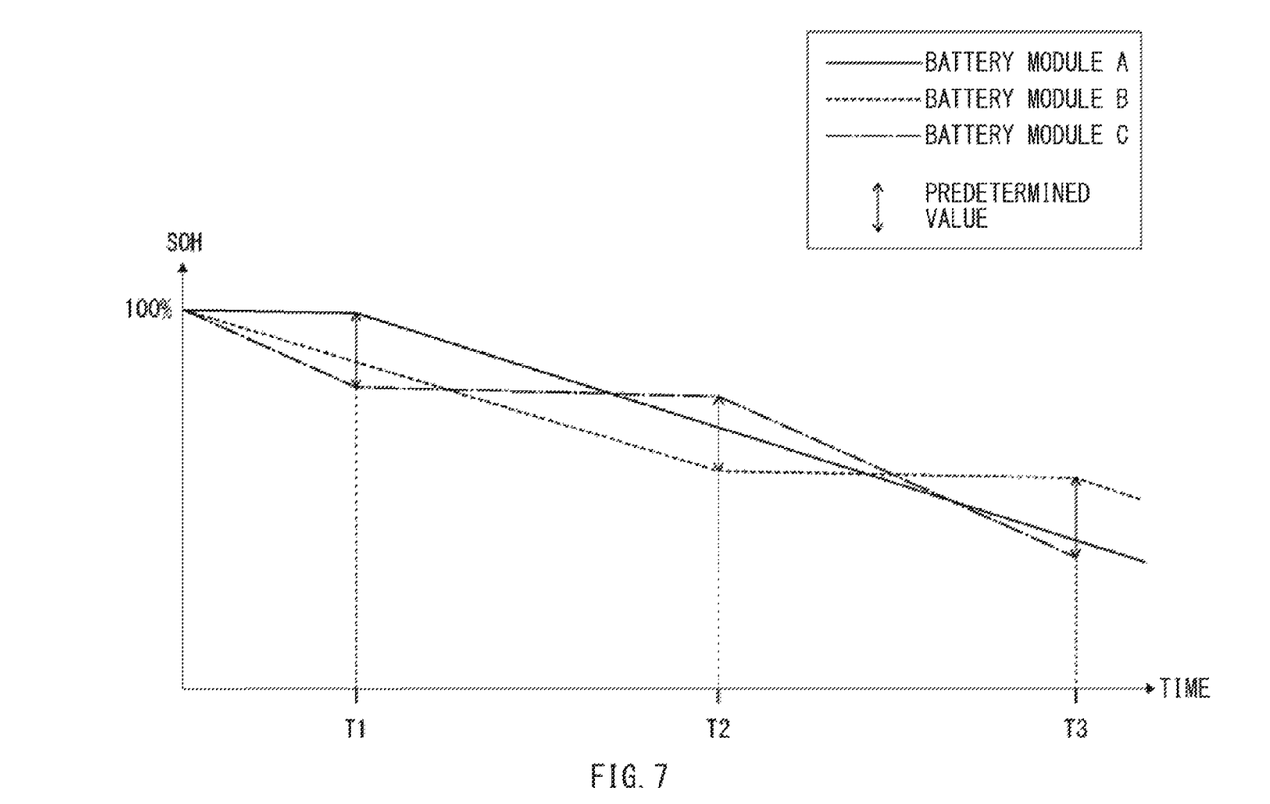
FIG. 7 is a graph illustrating an exemplary change in state of health of each battery module at the time when the low-voltage power feeder module is switched in accordance with one example embodiment of the technology.

As illustrated in FIG. 7, the SOH of the battery module A selected first as the low-voltage power feeder module LB may decrease more moderately than those of the battery modules B and C.

As the SOH of the battery modules A, B, and C continue to change, the difference in SOH between the battery module C corresponding to the lowest SOH module BB at time T1 and the battery module A having been selected as the low-voltage power feeder module LB reaches a predetermined value.

At the time T1, the selection processing unit 12 may select the battery module C corresponding to the lowest SOH module BB at the time T1 as the low-voltage power feeder module LB. The low-voltage power feeder module LB may be thereby switched from the battery module A to the battery module C.

This causes the SOH of the battery module C to decrease more moderately after the time T1 than before the time T1.

As the SOH of the battery modules A, B, and C continue to change, the SOH of the battery module A and the SOH of the battery module B may become lower than the SOH of the battery module C after the time T1. At time T2, the difference in SOH between the battery module C having been selected as the low-voltage power feeder module LB and the battery module B corresponding to the lowest SOH module BB may reach the predetermined value.

At the time T2, the selection processing unit 12 may select the battery module B which corresponds to the lowest SOH module BB at the time T2 as the low-voltage power feeder module LB.

This causes the SOH of the battery module B to decrease more moderately after the time T2 than before the time T2.

As the SOH of the battery modules A, B, and C continue to change, the SOH of the battery module A and the SOH of the battery module C may become lower than the SOH of the battery module B. At time T3, the difference in SOH between the battery module B having been selected as the low-voltage power feeder module LB and the battery module C corresponding the lowest SOH module BB may reach the predetermined value.

At the time T3, the selection processing unit 12 may select the battery module C corresponding to the lowest SOH module BB at the time T3 as the low-voltage power feeder module LB again.

As described above, the battery module BM selected as the low-voltage power feeder module LB may be switched every time the difference in SOH between the low-voltage power feeder module LB and the lowest SOH module BB reaches the predetermined value.

This configuration distributes the load to be exerted on the traveling battery 1 among the battery modules BM. Accordingly, it is possible to increase the lifetime of the traveling battery 1 as a whole.

Although described below, the determination as to whether the difference in SOH between the low-voltage power feeder module LB and the lowest SOH module BB is greater than or equal to the predetermined value may be performed in the IG-ON state; however, actual switching control may be performed in the IG-OFF state. Accordingly, if the difference in SOH between the low-voltage power feeder module LB and the other battery module BM becomes greater than or equal to the predetermined value in the READY-ON state, the low-voltage power feeder module LB may be switched after the READY-ON state is switched to the IG-OFF state.

Figure 8:
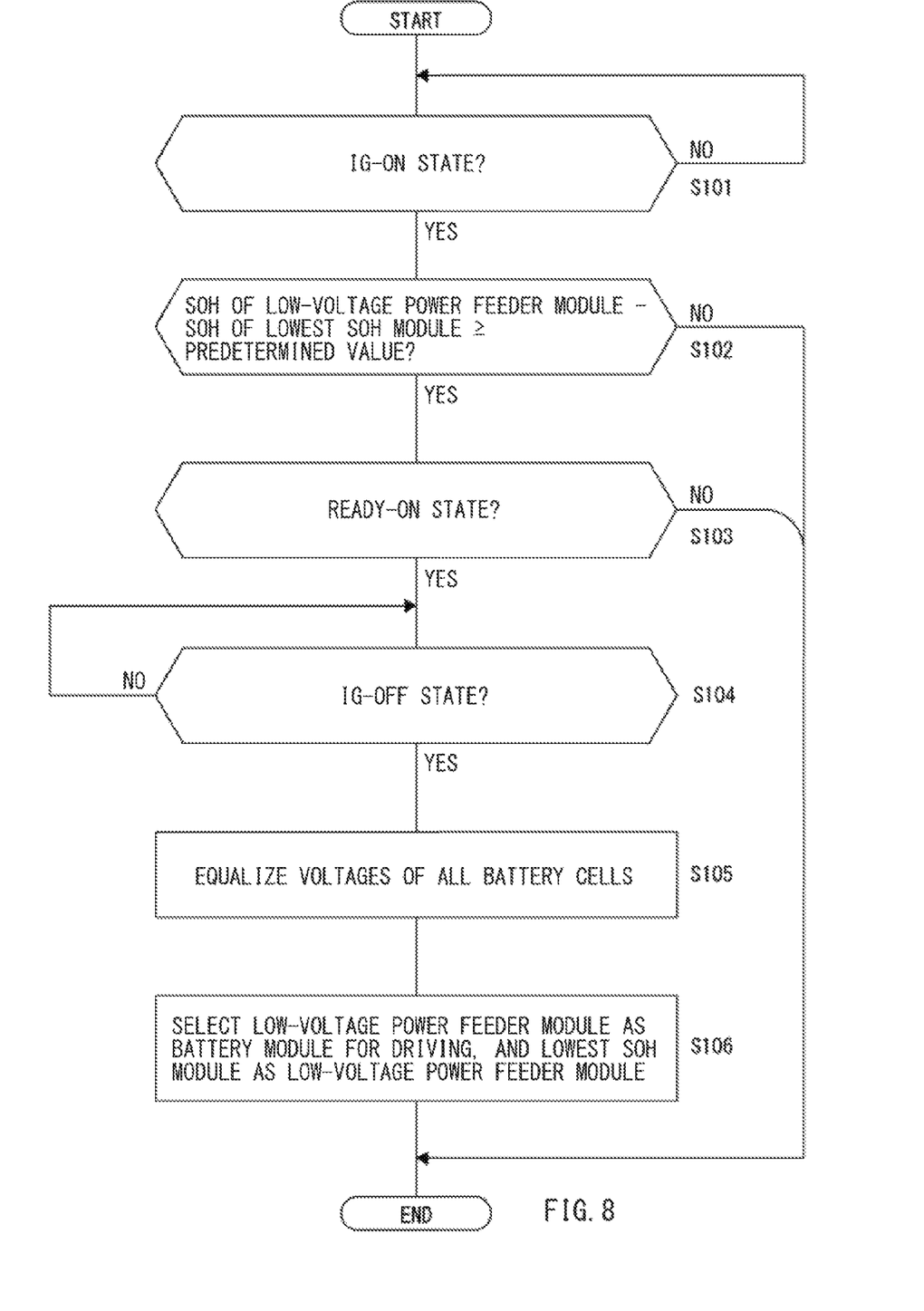
FIG. 8 is a flowchart illustrating a selection process according to one example embodiment of the technology.

An exemplary flow of the selection process performed by the selection processing unit 12 will now be described with reference to FIG. 8. The selection process described below may be executed by the CPU of the BCU 3 in accordance with the program stored in the ROM.

First, in Step S101, the BCU 3 may determine whether the vehicle 100 is in the IG-ON state. If the vehicle 100 is not determined to be in the IG-ON state (Step S101: NO), the BCU 3 may repeat Step S101. If the vehicle 100 is determined to be in the IG-ON state (Step S101: YES), the BCU 3 may cause the process to proceed to Step S102.

In Step S102, the BCU 3 may determine whether the difference in SOH between the low-voltage power feeder module LB and the lowest SOH module BB is greater than or equal to the predetermined value.

If the difference in SOH between the low-voltage power feeder module LB and the lowest SOH module BB is not determined to be greater than or equal to the predetermined value (Step S102: NO), the BCU 3 may end the selection process illustrated in FIG. 8.

In contrast, if the difference in SOH between the low-voltage power feeder module LB and the lowest SOH module BB is determined to be greater than or equal to the predetermined value (Step S102: YES), the BCU 3 may cause the process to proceed to Step S103.

In Step S103, the BCU 3 may determine whether the vehicle 100 is in the READY-ON state.

If the vehicle 100 is not determined to be in the READY-ON state (Step S103: NO), i.e., if it is determined that the user has performed an operation that brings the vehicle 100 into the IG-OFF state (Step S103: NO), the BCU 3 may end the selection process illustrated in FIG. 8.

In contrast, if the vehicle 100 is determined to be in the READY-ON state (Step S103: YES), the BCU 3 may cause the process to proceed to Step S104.

In Step S104, the BCU 3 may determine whether the vehicle 100 is in the IG-OFF state. If the vehicle 100 is not determined to be in the IG-OFF state (Step S104: NO), the BCU 3 may perform Step S104 again. If the vehicle 100 is determined to be in the IG-OFF state (Step S104: YES), the BCU 3 may cause the process to proceed to Step S105.

In Step S105, the BCU 3 may equalize the SOC of all the battery cells.

For example, the SOC of the battery cells other than the battery cell exhibiting the lowest SOC may be equalized by reducing the SOC of the other battery cells to the SOC of the battery cell exhibiting the lowest SOC using resistance.

The SOC of the low-voltage power feeder module LB may often differ from the SOC of the other battery modules BM because they are used differently. The difference in SOC between the battery modules BM can adversely affect the control of the traveling battery 1 upon electric power supply to the traveling motor 4.

An example adverse effect may be as follows. The vehicle supplies electric power to the traveling motor 4 using all the battery modules BM except the low-voltage power feeder module LB. If one of the N battery modules BM used to supply electric power to the traveling motor 4 becomes out of use due to its low SOC, the remaining battery modules BM also become out of use regardless of their remaining SOC.

To avoid such an adverse effect, in Step S105, the BCU 3 may equalize the SOC of the battery cells in the battery modules BM each time the IG is brought into the IG-OFF state.

After Step S105, the BCU 3 may cause the process to proceed to Step S106.

In Step S106, the BCU 3 may select the low-voltage power feeder module LB at the time of Step S102 as the battery module for driving, and the lowest SOH module BB at the time of Step S102 as the low-voltage power feeder module LB on the basis of the result of the determination in Step S102. Thereafter, the BCU 3 may send the selection unit 6 a command to perform the switching.

After sending the command, the BCU 3 may end the selection process.

It should be understood that example embodiments of the technology should not be limited to the foregoing example embodiments and that various modification examples may be made.

For example, according to the foregoing example embodiments, the difference in SOH between the low-voltage power feeder module LB and the lowest SOH module BB may be calculated each time the IG determination unit 13 determines the IG-ON state. However, according to a first modification example, the difference in SOH between the low-voltage power feeder module LB and the lowest SOH module BB may be calculated at a predetermined time cycle, e.g., at several months interval, and the battery module BM exhibiting the lowest SOH at the time of calculation may be selected as the low-voltage power feeder module LB.

The SOH of the traveling battery does not largely decrease in a single driving operation but decreases over time. Thus, the difference in SOH may be calculated once every several months, rather than every time the IG is turned on by the user.

This eliminates the need to calculate the difference in SOH between the low-voltage power feeder module LB and the lowest SOH module BB every time the IG is turned on, reducing the processing load on the BCU 3.

According to another modification example, the SOH may be calculated on the basis of the resistance of the battery modules only when the difference in SOH between the low-voltage power feeder module LB and the lowest SOH module BB is calculated. This configuration reduces the execution frequency of a process that imposes the load on the battery modules, such as a process for applying electric currents to the battery modules.

According to the example embodiments described above, the vehicle 100 includes the traveling motor 4, the traveling battery 1, the low-voltage electric component 7, the one or more processors, and the storage medium. The traveling motor 4 is configured to drive wheels of the vehicle. The traveling battery 1 includes the battery modules BM each including the battery cells, and is configured to supply electric power to the traveling motor 4. The low-voltage electric component 7 is configured to operate at a voltage lower than an output voltage of the traveling battery 1. The storage medium is configured to store a program to be executed by the one or more processors. The program includes one or more commands. The one or more commands are configured to cause the one or more processors to perform the state-of-health calculation process of calculating the states of health of the respective battery modules BM and the selection process of selecting the low-voltage power feeder module LB from the battery modules BM on the basis of the result of calculation of the states of health in the state-of-health calculation process. The low-voltage power feeder module LB corresponds to one of the battery modules BM to be used to supply electric power to the low-voltage electric component 7.

By using one of the battery modules as a substitute for an auxiliary battery, it is possible to provide a vehicle including no auxiliary battery and reduce failures at the time of starting of the vehicle due to a malfunction of the auxiliary battery, unlike a configuration in which all the battery modules are used to drive the vehicle.

Unlike a typical auxiliary battery that should be replaced once several years, the high-voltage battery exemplified by the traveling battery 1 is so precisely controlled that it requires few replacements other than at the time of failure or after the lifetime (e.g., about 20 years). Accordingly, it is possible to reduce the frequency of user maintenance.

In the vehicle 100 according to at least one of the foregoing example embodiments, the command is configured to cause the one or more processors to perform, as the selection process, the process of selecting one of the battery modules with the lowest state of health as the low-voltage power feeder module LB.

By selecting the lowest SOH module BB as a substitute for an auxiliary battery, the load on the traveling battery 1 as a whole is distributed. This reduces the deterioration of the battery modules.

In the vehicle 100 according to at least one of the foregoing example embodiments, the command is configured to cause the one or more processors to perform, as the state-of-health calculation process, the process of calculating the states of health of the battery modules on the basis of the SOC of the battery modules on a full charge.

By calculating the rate of decrease in SOC of the traveling battery 1 with respect to the reference SOC, i.e., the SOC of the traveling battery 1 on a full charge as described above, it is possible to calculate the SOH of the traveling battery 1 on the basis of the SOC of the traveling battery 1 on a full charge that is related to the cruising distance of the vehicle 100.

The calculation method described above is suitable for the vehicle 100 which is a cruising distance-centered electric vehicle including the traveling battery 1 with a relatively large-capacity.

In the vehicle 100 according to at least one of the foregoing example embodiments, the command is configured to cause the one or more processors to perform, as the state-of-health calculation process, the process of calculating the states of health of the battery modules BM on the basis of the resistance of the battery modules CM.

By calculating the SOH of the traveling battery 1 on the basis of the resistance of the traveling battery 1 as described above, it is possible to calculate the SOH on the basis of the resistance that is related to an output of the vehicle.

The calculation method described above is suitable for the vehicle 100 which is an output-centered electric vehicle including the traveling batter 1 with a relatively small-capacity.

In the vehicle 100 according to at least one of the foregoing example embodiments, the command is configured to cause, after the selection process of selecting the low-voltage power feeder module, the one or more processors to perform a reselection process of reselecting the low-voltage power feeder module LB on the basis of the result of calculation of the states of health of the battery modules other than the battery module selected as the low-voltage power feeder module.

Accordingly, one battery module BM exhibiting a decrease in SOH is selected as the low-voltage power feeder module LB from the battery modules BM other than the battery module selected as the low-voltage power feeder module LB.

This allows the battery module BM exhibiting a decrease in SOH to be selected as the low-voltage power feeder module LB in sequence.

Therefore, it is possible to increase the lifetime of the traveling battery 1 as a whole by moderating the decrease in the SOH of the traveling battery 1 as a whole.

In the vehicle 100 according to at least one of the foregoing example embodiments, the low-voltage power feeder module LB may be switched when the difference in SOH between the low-voltage power feeder module LB and the lowest SOH module BB is greater than or equal to the predetermined value. Alternatively, the difference in SOH may be calculated regularly, and the battery module BM exhibiting the lowest SOH at the time of calculation may be selected as the low-voltage power feeder module LB.

According to the foregoing example embodiments of the technology, the low-voltage power feeder module is selected on the basis of the states of health of the battery modules. For example, the battery module exhibiting the lowest SOH may be selected as the low-voltage power feeder module from the battery modules. This configuration reduces the progress of deterioration of the battery module selected as the low-voltage power feeder module.

According to the foregoing example embodiments of the technology, it is possible to provide a vehicle including no auxiliary battery.

This configuration distributes the load on the battery modules. Therefore, it is possible to reduce the progress of the deterioration of the traveling battery as a whole and increase the lifetime of the traveling battery.

The invention claimed is:

1. A vehicle comprising:
a traveling motor configured to drive at least one wheel of the vehicle;
a traveling battery including battery modules and configured to supply electric power to the traveling motor, each of the battery modules including battery cells and a sensor configured to detect a state of charge or resistance of the battery module;
a low-voltage electric component configured to operate at a voltage lower than an output voltage of the traveling battery;
at least one processor; and
a storage medium configured to store a program to be executed by the at least one processor, wherein the program includes at least one command, and the at least one command is configured to cause the at least one processor to,
obtain, from each respective battery modules, data indicating the state of charge or resistance of the battery module from the sensor,
perform a state-of-health calculation process of calculating states of health of the respective battery modules based on the obtained data, and
select, during a selection process, a low-voltage power feeder module from the battery modules on a basis of a result of calculation of the states of health, wherein the selected low-voltage power feeder module is one of the battery modules with a lowest state of health,
send a command indicating the selection of the low-voltage power feeder module,
in response to receiving the command, the low-voltage electric component being switched to the selected low-voltage power feeder module for electric power supply.

2. The vehicle according to claim 1, wherein
the at least one command is configured to cause the at least one processor to perform, as the state-of-health calculation process, a process of calculating the states of health of the respective battery modules on a basis of states of charge of the respective battery modules on a full charge.

3. The vehicle according to claim 1, wherein
the at least one command is configured to cause the at least one processor to perform, as the state-of-health calculation process, a process of calculating the states of health of the respective battery modules on a basis of the resistance of the respective battery modules.

4. The vehicle according to claim 1, wherein,
after the selection process of selecting the low-voltage power feeder module, the at least one command is configured to cause the at least one processor to perform a reselection process of reselecting the low-voltage power feeder module on a basis of the result of calculation of the states of health of the respective battery modules other than the one of the battery modules selected as the low-voltage power feeder module.

5. The vehicle according to claim 2, wherein,
after the selection process of selecting the low-voltage power feeder module, the at least one command is configured to cause the at least one processor to perform a reselection process of reselecting the low-voltage power feeder module on a basis of the result of calculation of the states of health of the respective battery modules other than the one of the battery modules selected as the low-voltage power feeder module.

6. The vehicle according to claim 3, wherein,
after the selection process of selecting the low-voltage power feeder module, the at least one command is configured to cause the at least one processor to perform a reselection process of reselecting the low-voltage power feeder module on a basis of the result of calculation of the states of health of the respective battery modules other than the one of the battery modules selected as the low-voltage power feeder module.

7. A vehicle comprising:
a traveling motor configured to drive at least one wheel of the vehicle;
a traveling battery including battery modules and configured to supply electric power to the traveling motor, each of the battery modules including battery cells and a sensor configured to detect a state of charge or resistance of the battery module;

a low-voltage electric component configured to operate at a voltage lower than an output voltage of the traveling battery;

a relay provided between the traveling motor and the traveling battery;

switches provided corresponding to respective battery modules; and circuitry configured to:
- obtain, from each of the respective battery modules, data indicating the state of charge or resistance of the battery module from the sensor;
- calculate a state of health (SOH) of the respective battery modules based on the obtained data;
- determine one of the battery modules with the lowest SOH from the battery modules; and
- in response to determination of the one of the battery modules with the lowest SOH, execute a selection process, wherein in the selection process, the circuitry i) sets the determined one of the battery modules with the lowest SOH as a first module, ii) sets the rest of the battery modules other than the determined one of the battery modules with the lowest SOH among the battery modules as a second module, and (iii) controls the switches to (1) electrically connect the first module to the low-voltage electric component, (2) electrically disconnect the first module from the relay, (3) electrically disconnect the second module the low-voltage electric component, and (4) electrically connect the second module to the relay.

8. The vehicle according to claim 7, wherein the circuitry is further configured to:
- determine whether a difference in SOH between the first module and the determined one of the battery modules with the lowest SOH is greater than or equal to a predetermined value; and
- in response to determining that the difference is greater than or equal to the predetermined value, re-execute the selection process.

* * * * *